United States Patent [19]

Lyon et al.

[11] Patent Number: 5,313,240
[45] Date of Patent: May 17, 1994

[54] SINGLE-USE CAMERA WITH REMOVABLE END PORTION FOR CARTRIDGE ACCESS

[75] Inventors: Ralph M. Lyon, Rochester; William H. Goddard, Hilton, both of N.Y.

[73] Assignee: Eastman Kodak Company, Rochester, N.Y.

[21] Appl. No.: 16,400

[22] Filed: Feb. 11, 1993

[51] Int. Cl.⁵ ............................................. G03B 17/02
[52] U.S. Cl. .................................................... 354/288
[58] Field of Search ............................ 354/75, 76, 288

[56] References Cited

U.S. PATENT DOCUMENTS

| | | | |
|---|---|---|---|
| 3,631,783 | 1/1972 | Jones | 354/213 |
| 3,650,194 | 3/1972 | Penick Ib | 354/254 |
| 3,782,259 | 1/1974 | Noble | 354/190 |
| 4,077,041 | 2/1978 | Imura | 354/21 |
| 4,742,366 | 5/1988 | Nakazawa | 354/204 |
| 4,746,945 | 5/1988 | Chan | 354/204 |
| 4,980,713 | 12/1990 | Fujita et al. | 354/275 |

FOREIGN PATENT DOCUMENTS 61-88242 5/1986 Japan .
63-271434 11/1988 Japan ........................... 354/288
2-154244 6/1990 Japan .

Primary Examiner—Michael L. Gellner
Assistant Examiner—Howard B. Blankenship
Attorney, Agent, or Firm—Roger A. Fields

[57] ABSTRACT

A single-use camera comprises an exterior decorative cardboard casing having an open end and a cut-out, and a plastic light-tight camera housing having an end portion with a film cartridge receiving chamber located outside the exterior casing adjacent the open end and a remaining portion including a taking lens located inside the exterior casing with the taking lens at the cut-out. According to the invention, the end portion and the remaining portion of the camera housing include respective cooperating means for removably connecting the end portion to the remaining portion to permit the end portion to be disconnected from the remaining portion to uncover the cartridge receiving chamber without being obstructed by the exterior casing, whereby a film cartridge may be removed from the cartridge receiving chamber without first taking the exterior casing off the camera housing.

2 Claims, 1 Drawing Sheet

SINGLE-USE CAMERA WITH REMOVABLE END PORTION FOR CARTRIDGE ACCESS

CROSS-REFERENCE TO RELATED APPLICATION(S)

Reference is made to commonly assigned copending application Ser. No. 08/016,389 entitled SINGLE-USE CAMERA WITH DOOR FOR CARTRIDGE RECEIVING CHAMBER, and filed Feb. 11, 1993 in the names Ralph Merwinly and Mark Alan Camphion.

BACKGROUND OF THE INVENTION

1. Field of the Invention

The invention relates generally to the field of photography, and in particular to single-use cameras.

2. Description of the Prior Art 35 mm film and cameras that are all in one, commonly referred to as "single-use cameras", have become well known recently. Each single-use camera is a point-and-shoot type and it comprises a plastic light-tight camera housing, including a film cartridge receiving chamber, and an exterior decorative cardboard casing which snugly contains the camera housing. At the manufacturer, the cartridge receiving chamber is loaded with a 35 mm film cartridge and substantially the entire length of the unexposed filmstrip is factory prewound from the film cartridge into a film supply chamber of the camera housing. After the user takes a picture, a thumbwheel is manually rotated to rewind the exposed frame into the film cartridge. The rewinding movement of the filmstrip the equivalent of one frame rotates a metering sprocket to decrement an exposure counter to its next lower number setting. When the entire length of the filmstrip is exposed and rewound into the film cartridge, the single-use camera is given to a photofinisher who tears the exterior casing off the camera housing, breaks open the camera housing, and removes the film cartridge from the cartridge receiving chamber. Then, the film cartridge is broken open and the exposed filmstrip is withdrawn for processing. The unbroken parts of the single-use camera may be recycled.

Prior art U.S. Pat. No. 4,890,130, issued Dec. 26, 1989, discloses a single-use camera in which a plastic light-tight camera housing includes a break open part of a rear or bottom wall of the housing or a hinged door at the bottom wall which are opened to access a film cartridge in a cartridge receiving chamber of the housing. An exterior decorative cardboard casing which covers the break open part or the hinged door must be torn out of the way of the break open part or the hinged door before it is opened.

Recently, a single-use camera with the product name "Konica MINI" was announced in Japan. The Konica MINI comprises an exterior decorative cardboard casing having an open end, and a plastic light-tight camera housing arranged partly inside the exterior casing and having an end portion with a cartridge receiving chamber located outside the exterior casing. Locating the end portion with the cartridge receiving chamber outside the exterior casing, permits a remaining portion of the camera housing to be made relatively thin since the film cartridge is the thickest component and the exterior casing must snugly contain the camera housing. If the exterior casing covered the end portion with the cartridge receiving chamber as in U.S. Pat. No. 4,890,130, the remaining portion of the camera housing would likely have to be thickened to conform with the end portion. To remove the film cartridge from the cartridge receiving chamber, a rear half of the camera housing is disconnected from a front half of the housing. Consequently, the exterior casing must first be torn off the camera housing.

PROBLEM TO BE SOLVED BY THE INVENTION

In U.S. Pat. No. 4,890,130 and the Konica MINI, the exterior decorative cardboard casing must be torn off the plastic light-tight camera housing before opening the camera housing to remove a film cartridge from a cartridge receiving chamber in the housing.

SUMMARY OF THE INVENTION

According to the invention, a single-use camera comprising an exterior decorative cardboard casing having an open end and a cut-out, and a plastic light-tight camera housing having an end portion with a film cartridge receiving chamber located outside the exterior casing adjacent the open end and a remaining portion including a taking lens located inside the exterior casing with the taking lens at the cut-out, is characterized in that:

the end portion and the remaining portion of the camera housing include respective cooperating means for removably connecting the end portion to the remaining portion to permit the end portion to be disconnected from the remaining portion to uncover the cartridge receiving chamber without being obstructed by the exterior casing, whereby a film cartridge may be removed from the cartridge receiving chamber without first taking the exterior casing off the camera housing.

DETAILED DESCRIPTION OF THE PREFERRED EMBODIMENT

Figure 1:
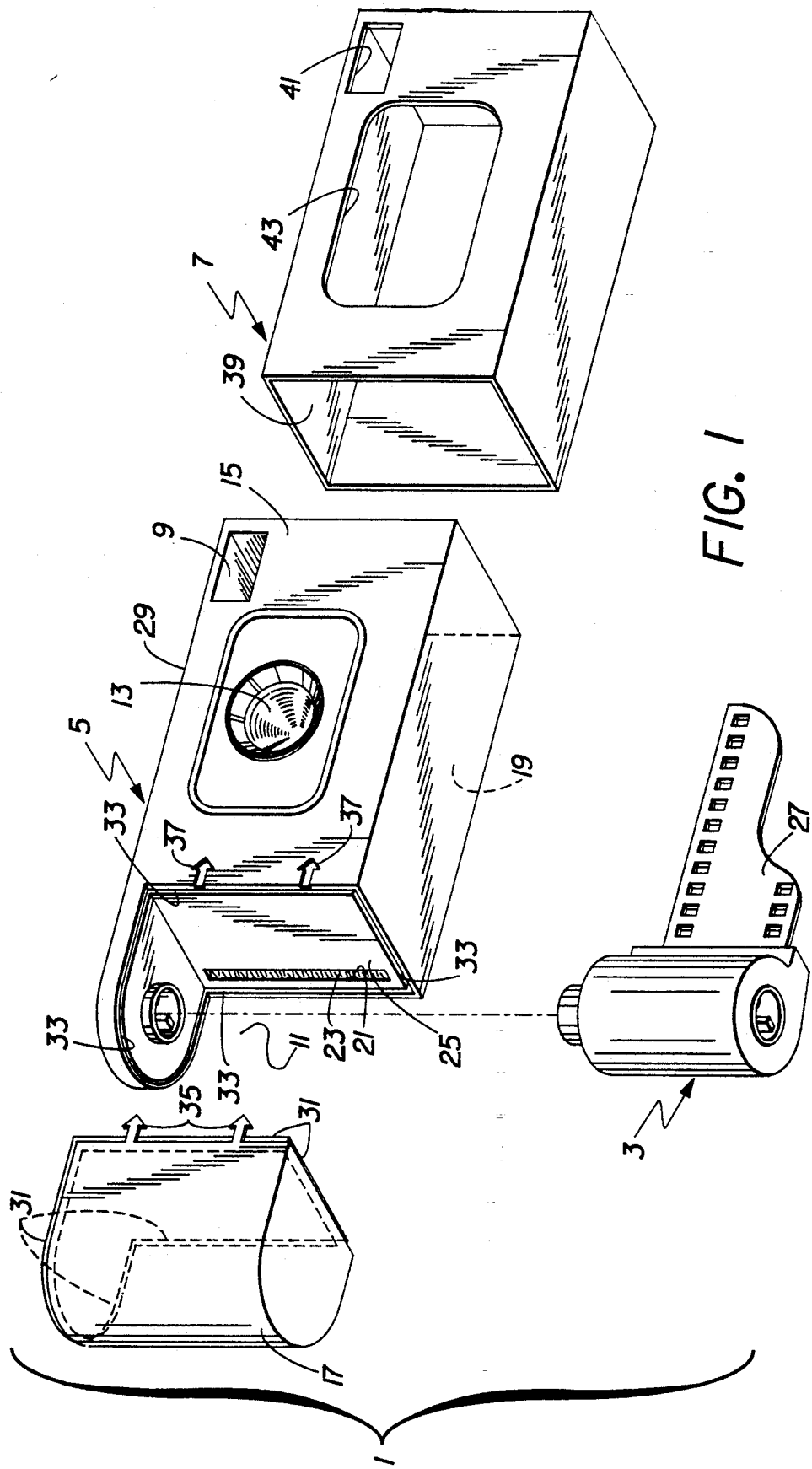
FIG. 1 is an exploded perspective view of a single-use camera according to a preferred embodiment of the invention.

The invention is disclosed as being embodied preferably in a 35 mm single-use camera. Because the features of a single-use camera are generally known, this description is directed in particular only to camera elements forming part of or cooperating directly with the invention. It is to be understood, however, that other elements not specifically shown or described may take various forms known to persons of ordinary skill in the art.

Referring now to the drawing, FIG. 1 shows a 35 mm single-use camera 1 comprising a conventional 35 mm film cartridge 3, a plastic light-tight camera housing 5, and an exterior decorative cardboard casing 7.

The camera housing 5 includes a direct see-through viewfinder tunnel 9 for viewing a subject to be photographed and a cartridge receiving chamber 11 for the film cartridge 3. A fixed focus taking lens 13 is mounted at a front wall 15 of the camera housing 5. The chamber 11 is normally enclosed by an end portion 17 of the camera housing 5. The end portion 17 is a single curved piece that forms respective parts of the front wall 15 and a rear wall 19 of the camera housing 5 to wrap around the chamber 11. A film ingress/egress slot 21 with a light-tight plush material 23 is located in a cross wall 25 of the camera housing to admit an unexposed filmstrip 27 from the cartridge 3 to the interior of the housing and to return the filmstrip after exposure to the cartridge.

The end portion 17 and a remaining portion 29 of the camera housing 5 include a continuous tongue 31 and a continuous groove 33 which can be coupled to connect the end portion to the remaining portion to hold the cartridge 3 in the chamber 11 and can be uncoupled to disconnect the end portion from the remaining portion to permit the cartridge to be removed from the chamber. When the tongue 31 resides in the groove 33, the tongue and the groove cooperate to prevent ambient light from entering the chamber 11. Preferably, the end portion 17 has several flexible tabs 35 (only two shown) which can be removably placed in complementary shaped cavities 37 (only two shown) in the remaining portion 29 to releasably lock the end portion to the remaining portion.

The exterior casing 7 is dimensioned to receive only the remaining portion 29 of the camera housing 5, through an open end 39 of the casing, to snugly partly contain the housing except for its end portion 17. The exterior casing 7 has respective cut-outs 41 and 43 for the viewfinder tunnel 9 and the taking lens 13. The end portion 17 is located outside the exterior casing 7 at the open end 39 to allow the end portion to uncover the chamber 11 without being obstructed by the exterior casing. Consequently, the cartridge 3 can be removed from the chamber 11 without first tearing the exterior casing 7 off the camera housing 5.

The invention has been described with reference to a preferred embodiment. However, it will be appreciated that modifications and variations can be effected by persons of ordinary skill in the art without departing from the scope of the invention.

We claim:

1. A single-use camera comprising an exterior decorative cardboard casing having an open end and a cut-out, and a plastic light-tight camera housing having an end portion with a film cartridge receiving chamber located outside said exterior casing adjacent said open end and a remaining portion including a taking lens located inside the exterior casing with said taking lens at said cut-out, is characterized in that:

said end portion and said remaining portion of the camera housing include respective cooperating means for removably connecting the end portion to the remaining portion to permit the end portion to be disconnected from the remaining portion to uncover said cartridge receiving chamber without being obstructed by said exterior casing, whereby a film cartridge may be removed from said cartridge receiving chamber without first taking said exterior casing off said camera housing.

2. A single-use camera as recited in claim 1, wherein said end portion is a single piece forming respective parts of a front wall and a rear wall of said camera housing to wrap around said cartridge receiving chamber.

* * * * *

UNITED STATES PATENT AND TRADEMARK OFFICE
CERTIFICATE OF CORRECTION

PATENT NO. : 5,313,240
DATED : May 17, 1994
INVENTOR(S) : R.M. Lyon et al

It is certified that error appears in the above-indentified patent and that said Letters Patent is hereby corrected as shown below:

In Column 1, line 11 delete "Ralph Merwily and Mark Alan Camphion" and insert --Ralph Merwin Lyon and Mark Alan Lamphron--

Signed and Sealed this

Thirteenth Day of September, 1994

*Attest:*

BRUCE LEHMAN

*Attesting Officer*     Commissioner of Patents and Trademarks